United States Patent [19]
Walter

[11] Patent Number: 4,506,387
[45] Date of Patent: Mar. 19, 1985

[54] PROGRAMMING-ON-DEMAND CABLE SYSTEM AND METHOD

[76] Inventor: Howard F. Walter, P.O. Box 11617, Fort Wayne, Ind. 46859

[21] Appl. No.: 497,885

[22] Filed: May 25, 1983

[51] Int. Cl.³ .............................................. H04N 7/16
[52] U.S. Cl. ...................... 455/612; 455/3; 455/6; 455/53; 358/86; 370/3
[58] Field of Search ............... 455/4, 5, 6, 53, 612; 358/86, 102, 114

[56] References Cited
U.S. PATENT DOCUMENTS

| | | | |
|---|---|---|---|
| 3,696,392 | 10/1972 | Fossum et al. | 340/717 |
| 3,725,874 | 4/1973 | Van Heel | 364/200 |
| 3,931,512 | 1/1976 | Kent et al. | 250/205 |
| 3,997,913 | 12/1976 | Rittenbach | 360/8 |
| 4,062,043 | 12/1977 | Zeidler et al. | 358/86 |
| 4,071,697 | 1/1978 | Bushnell et al. | 179/2 TV |
| 4,131,765 | 12/1978 | Kahn | 179/81 R |
| 4,135,202 | 1/1979 | Cutler | 358/86 |
| 4,381,522 | 4/1983 | Lambert | 358/86 |

OTHER PUBLICATIONS

*16 Shows & What Do You Get* from Video Magazine, Jul. 1983.
Dr. M. Kawahata, "The HI-OVIS Optical Communication System", (17–20 Sep. 1979).

*Primary Examiner*—Robert L. Griffin
*Assistant Examiner*—Timothy K. Greer
*Attorney, Agent, or Firm*—Albert L. Jeffers; Anthony Niewyk

[57] ABSTRACT

A programming-on-demand cable system is provided which allows any one of a plurality of individual users to request anyone of a plurality of video programs they wish to view from a library of programs, and permits the requested program to be available for viewing on a conventional television set at the user's location following a request initiated by the user. Each program is preprogrammed in a memory device selectable by a host computer at a central data station in response to an address signal transmitted from the user. The host computer in conjunction with other electronics transmits the video program at a high non-real-time rate over a fiber optic line network to a data receiving station at the user's location. The data receiving station then converts the received optical data back to electrical data and stores it for subsequent real-time transmission to the user's television set. The system permits the user to view any one of a number of programs transmitted on a non-real-time basis, and also allows the user to store the transmitted program at his data receiving station for an indefinite period of time for viewing at a later date. A method is also provided for transmitting the programs on a non-real-time basis.

14 Claims, 4 Drawing Figures

4,506,387

PROGRAMMING-ON-DEMAND CABLE SYSTEM AND METHOD

BACKGROUND OF THE INVENTION

This invention pertains to a broadcasting cable system, and more particularly to a programming-on-demand cable system wherein any one of a plurality of stored video programs can be broadcast in a non-real-time basis to a user.

Generally and to the best of applicant's knowledge, existing video broadcast services provide a user any one of a plurality of programs to be viewed on a real-time basis. The user may select any one of the video programs, however, he is restricted in his enjoyment of the program in that the user has no control over when in time the program is broadcast to his video or television set. For example, video programs are routinely announced in video or television guides listing the programs available to the user for his choice in viewing at a specific time of day. Consequently, the user does not have the choice of viewing the program when he so desires, but rather is restricted to that particular time listed in the video or television guide.

Moreover, it would be much too impractical and costly to provide the necessary equipment to process numerous concurrent requests for real-time transmission of video programs at any time desired by the users.

Present broadcasting systems transmit the data by one of many methods, for example, "over-the-air", electrical lines or cables, fiber optic lines or cables, and the like. Presently, transmission by means of fiber optics is becoming more practical, however, the user is still restricted to viewing his program at a broadcasting time not of his choosing.

SUMMARY OF THE INVENTION

The present invention overcomes the problems and disadvantages of present broadcasting systems by providing an improved programing-on-demand cable system.

The programming-on-demand cable system of the present invention overcomes the inability of a user to select any one of a number of video programs for viewing at a time of his choice by providing a non-real-time transmission of the desired program. Any number of various programs are stored in memory devices at a central location or library and are viewable by a user at any time by means of the cable system of the present invention. A host computer at the library is electrically connected to the memory devices, and upon receiving an address signal from a keyboard located at the user's location, the host computer selects the memory device identified by the address signal, and causes the program stored therein to be transmitted by a fiber optic line to a data receiving station at the user's location. A central data station, of which the host computer is a part, causes the program identified by the address signal to be converted from electrical data to optical data and transmitted over the fiber optic line to the data receiving station, which then reconverts the optical data back to the original electrical data. Thereafter, the reconverted electrical data is transmitted to the user's television set for virtually immediate viewing; or the reconverted electrical data is stored in a memory module in the data receiving station for subsequent viewing by the user at the time of his choice. If necessary, the electrical data received by the data receiving station is reconstructed, which may be necessary if the electrical data is received in a form not acceptable by the television for viewing, and is transmitted at a normal rate to the user's television.

Further, the data transmitted from the central data station to the data receiving station is transmitted in multiplexed fashion so that the equipment at the central data station is dedicated for only a short period of time, for example, on the order of 20 to 30 seconds, thereby minimizing any delay between transmission of an address signal by the user and the receipt of the desired program at the user's location.

To facilitate the storage and manipulation of the video programs, and to allow the method to be placed under automatic computer control, the electrical data representing each video program is converted to compressed digital form and stored in suitable high density memory devices.

In one form of the invention, there is provided an improvement in a broadcasting system including a central data station having means for converting electrical data to optical data, a data receiving station having means for reconverting the optical data back to the electrical data, a fiber optic line means connecting the central data station and data receiving station for transmitting the optical data therethrough, and a broadcasting device electrically connected to the receiving station for receiving and broadcasting the reconverted electrical data to the user. The improvement comprises a plurality of memory devices electrically connected to the central data station, wherein each memory device is identifiable by a respective address signal and has preprogrammed therein respective electrical data representing a video program. Each memory device is responsive to its received address signal to thereby transmit its electrical data to the converting means. A user-operable generator device at the user's location is operatively connected to the central data station for selectively generating any one of the address signals and transmitting a selected address signal to the central data station, whereby the central data station transmits that address signal to the identified memory device which then transmits its electrical data to the converting means for subsequent transmission to and broadcasting by the broadcasting device at the user's location.

The present invention also provides a method for broadcasting on a non-real-time basis any one of a plurality of electrical data representing different video programs comprising the steps of providing a central data station including an electro-optical transducer for converting electrical data to optical data, a data receiving station including an opticoelectrical transducer for reconverting the optical data back to the electrical data, a fiber optic line means connecting the transducers, and a broadcasting device electrically connected to the data receiving station for receiving and broadcasting the electrical data transmitted. The method further comprises the steps of providing a plurality of memory devices electrically connected to the central data station, wherein each of the memory devices is identifiable by a respective address signal, and preprogramming each memory device with respective electrical data representing a video or broadcast program, each memory device being responsive to its received address signal to thereby transmit its electrical data to the electro-optical transducer. Further provided is a user-operable generator device at the location of the broadcasting device and which is operatively connected to the central data station and responsive to input applied by the user for generating any one of the address signals. Further steps are applying an input to the generator device to generate a selected one of the address signals, and transmitting the generated address signal to the central data station for identification of the memory device identifiable by the generated address signal. Thereafter, transmitting the generated address signal to the identified memory device, whereby the memory device transmits its electrical data to the electro-optical transducer for converting the electrical data to optical data and transmitting the optical data through the fiber optic line to the opticoelectrical transducer for reconverting the optical data back to the electrical data, and then transmitting the electrical data to the broadcasting device for the broadcast thereof.

It is an object of the present invention to provide a programming-on-demand cable system which permits a user to selectively control which program he desires to view at a particular time, subject only to the contents of the library of video programs maintained at the central data station.

Another object of the present invention is to provide a method for allowing a user to selectively control when and what program he desires to view, subject only to the contents of the library of video programs available.

Further objects of the present invention will appear as the description proceeds.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

Figure 1:
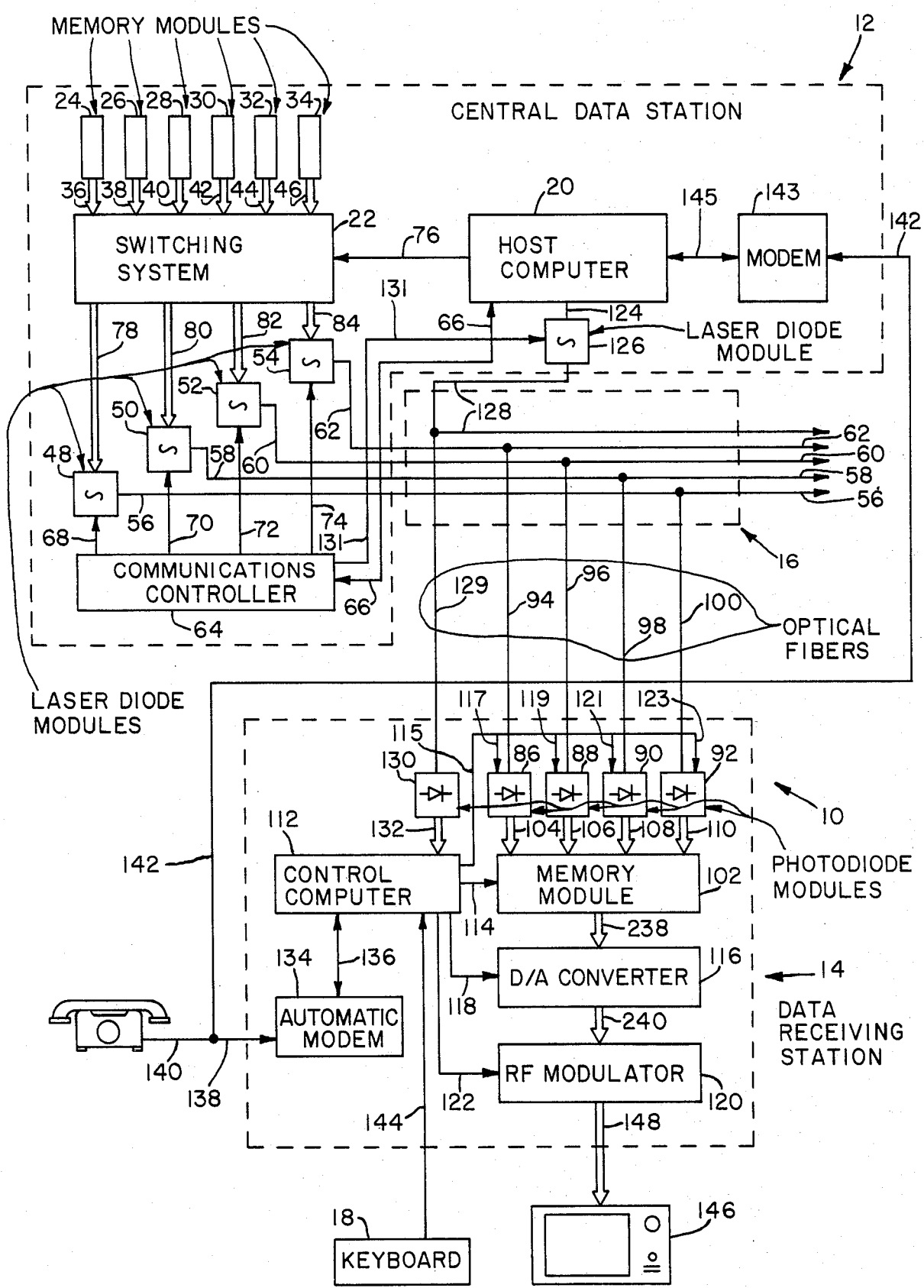
FIG. 1 is a schematic of a preferred embodiment of the present invention.

Referring to FIG. 1, programming-on-demand cable system 10 is schematically illustrated generally comprising central data station 12, data receiving station 14, a multi-fiber data bus 16, and keyboard 18.

Central data station 12 includes host computer 20 electrically connected to electronic switching system 22. The electronic switching system 22 is electrically connected to a library of memory modules 24, 26, 28, 30, 32, 34, as indicated by digital data flow arrows 36, 38, 40, 42, 44, 46, respectively. Electronic switching system 22 selectively connects any one of the memory modules 24–34 to multi-fiber data bus 16, as will be described in detail hereinafter. Although only one data bus 16 is illustrated in FIG. 1, the present invention contemplates numerous such data buses 16 wherein electronic switching system 22 is capable of selectively electrically connecting any memory module 24–34 to any one or plurality of other such data buses 16.

Although only six memory modules 24–34 are illustrated in FIG. 1 as representing a library of video programs, it should be understood that more or fewer such memory modules may be included in the library and connected to electronic switching system 22. In this particular embodiment, only six such memory modules 24–34 are illustrated, and each one contains a specific video program for broadcasting. The video programs are preprogrammed into respective memory modules 24–34 in digital format for rapid and inexpensive transmission, as will be described in greater detail below. It should be realized however, that the video programs may be stored in other formats, such as an analog format.

Central data station 12 further includes four laser diode modules 48, 50, 52, 54, each of which includes four pulse code modulators respectively connected in series with four laser diodes for converting digital data to optical data and one holographic plate, a description of which will be made in greater detail below with reference to FIG. 2. Continuing with FIG. 1, laser diode modules 48–54 are optically connected to fiber optic lines 56, 58, 60, 62, respectively, of multi-fiber data bus 16.

Host computer 20 is also electrically connected to communications controller 64 by line 66, which is further electrically connected to respective laser diode modules 48–54 by lines 68, 70, 72, 74. Following a command from host computer 20, communications controller 64 assumes control of fiber optic lines 56–62 of data bus 16.

Host computer 20 is electrically connected to electronic switching system 22 by line 76, and electronic switching system 22 is electrically connected to laser diode modules 48–54 as illustrated by digital data flow arrows 78, 80, 82, 84, respectively.

Figure 4:
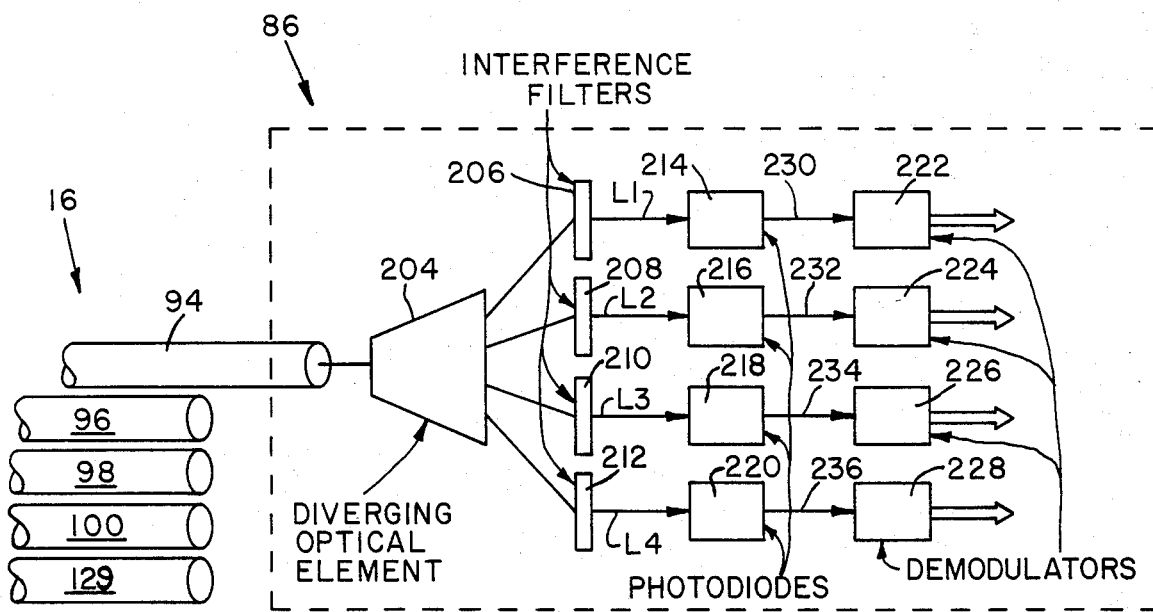
FIG. 4 is a schematic illustrating a portion of the multifiber data bus and the data receiving station of the embodiment of FIG. 1

Continuing to refer to FIG. 1, data receiving station 14 includes four photo-diode modules 86, 88, 90, 92 optically connected to fiber optic lines 62, 60, 58, 56, by fiber optic lines 94, 96, 98, 100, respectively. It is emphasized that fiber optic lines 56–62, which make up four of the five lines in multi-fiber data bus 16, continue on as illustrated in FIG. 1 by arrows to additional users. Each photodiode module 86–92 includes four filters, four photodiodes, and four demodulators connected in series as illustrated in FIG. 4, a more detailed description of which will continue below.

Photodiode modules 86–92 are connected to memory module 102 as illustrated by digital data flow arrows 104, 106, 108, 110, respectively. Data receiving station 14 further includes control computer 112 electrically connected to memory module 102 by line 114, to DA (digital-to-analog) converter 116 by line 118, and to RF modulator 120 by line 122. Control computer 112 is electrically connected to each of the photodiode modules 86, 88, 90, 92 by lines 117, 119, 121, 123, respectively, which branch off from line 115; this allows control computer 112 to transmit clock signals for data that requires synchronization to modules 86–92.

Host computer 20 is connected to control computer 112 by line 124, laser diode module 126, fiber optic line 128, fiber optic line 129 coupled to line 128, photodiode module 130, and digital data flow arrow 132. Laser diode module 126 includes only two pulse code modulators, two laser diodes, and one holographic plate; and photodiode module 130 includes two interference filters, two photodiodes, and two demodulators, which will be described in greater detail below with reference to FIG. 2. Fiber optic line 128 is the fifth of the five fiber optic lines in data bus 16 and continues on as illustrated in FIG. 1 to additional users. Communications controller 64 is connected to control computer 112 by line 131, laser diode module 126, fiber optic lines 128, 129, photodiode module 130, and digital data flow arrow 132.

Data receiving station 14 further includes automatic modem 134 electrically connected to control computer 112 by line 136. Automatic modem 134 communicates with host computer 20 by means of line 138, which is connected to the user's telephone line 140, telephone line 142, modem 143, and line 145.

Keyboard 18 is electrically connected to control computer 112 by line 144, and television 146 is connected to RF modulator 120 by analog data flow arrow 148.

Figure 2:
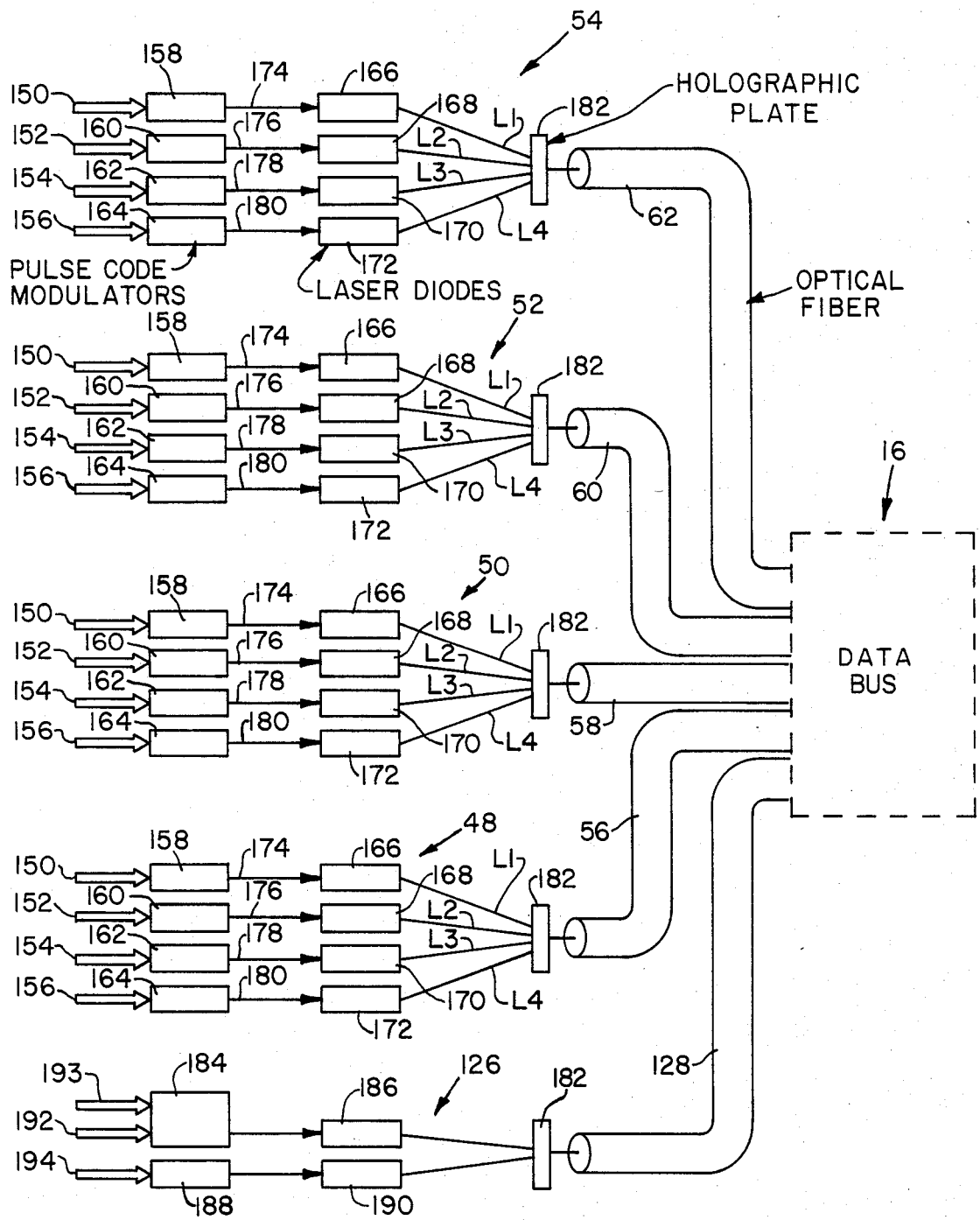
FIG. 2 is a schematic of a portion of the central data station and a multi-fiber data bus of the embodiment in FIG. 1.

Referring now to FIG. 2, a more detailed description of the interface between central data station 12 and multi-fiber data bus 16 will be made. FIG. 2 illustrates in an exploded manner the method in which laser diode modules 48–54 are operatively connected to fiber optic lines 56–62, respectively, and since the connection between each of the four laser diode modules to its respective fiber optic line is identical only one such description will be made and will suffice for all four.

Briefly, each program in each digital memory module 24–34 is logically divided into 16 data cells in that particular memory module so as to reduce the transmission time of the program. Each laser diode module 48–54 is designed to transmit four of the sixteen cells of data representing the program and are illustrated in FIG. 2 by digital data flow arrows 150, 152, 154, 156, which are included in, by example only in FIG. 1, digital data flow arrow 46 and make up the digital data flow arrow 84 when memory module 34 is selected.

It should be understood that, while four groups of data streams 150–156 are shown in FIG. 2, the data included in these groups of data streams is not identical. Each of the sixteen illustrated data streams 150–156 transfers data from respective ones of the sixteen unique data cells of one of the memory modules 24–34, each data stream comprising a portion of a single program. Continuing to refer to FIG. 2, four of the sixteen cells of data representing a single program of memory module 34 are separately transmitted to pulse code modulators 158, 160, 162, 164 for subsequent transmission to laser diodes 166, 168, 170, 172, respectively. Pulse code modulators 158–164 are electrically connected to laser diodes 166–172 by lines 174, 176, 178, 180, respectively. Digital data transmitted to pulse code modulators 158–164 are individually modulated and transmitted to laser diodes 166–172 by lines 174–180, and laser diodes 166–172 then transmit the digital data as optical data having different light wavelengths to holographic plate 182. As illustrated laser diodes 166–172 are oriented such that the four different light wavelengths L1, L2, L3, L4, converge at holographic plate 182, which redirects the four wavelengths in a parallel manner to fiber optic line 62. As described, the digital data transmitted to laser diode module 54 is now spectrally multiplexed in fiber optic line 62. Various methods for deflecting light beams, for example, by holographic plates, are disclosed in U.S. Pat. No. 4,062,043 issued Dec. 6, 1977 to Zeidler et al. The methods disclosed in Zeidler are used to deflect multiple light wavelengths onto a single fiber.

In a similar manner the other twelve cells of digital data are likewise spectrally multiplexed and transmitted through fiber optic lines 56–60.

FIG. 2 further illustrates the interface between fiber optic line 128 with central data station 12 and multi-fiber data bus 16 by means of laser diode module 126 comprising pulse code modulator 184 electrically connected in series with laser diode 186 and pulse code modulator 188 electrically connected in series with laser diode 190. Digital data flow arrow 193 represents line 124 connecting host computer 20 to laser diode module 126 in FIG. 1. Digital data flow arrow 193 transmits certain control data from host computer 20 to data receiving station 14 for display on the user's television 146. Digital data flow arrows 192, 194 represent line 131 (FIG. 1) connecting communications controller 64 to laser diode module 126. Flow arrow 192 transmits other control data to control computer 112, and flow arrow 194 illustrates transmission of synchronization data from communications controller 64 to control computer 112. The control and synchronization data are spectrally multiplexed in fiber optic line 128 in an identical manner as described above for line 62.

As explained above, optical data transmitted from laser diodes 166–172 is oriented to converge on holographic plate 182, however, it is recognized that the optical data could be transmitted from laser diodes 166–172 in a parallel fashion to a convex lens to be deflected to holographic plate 182.

Figure 3:
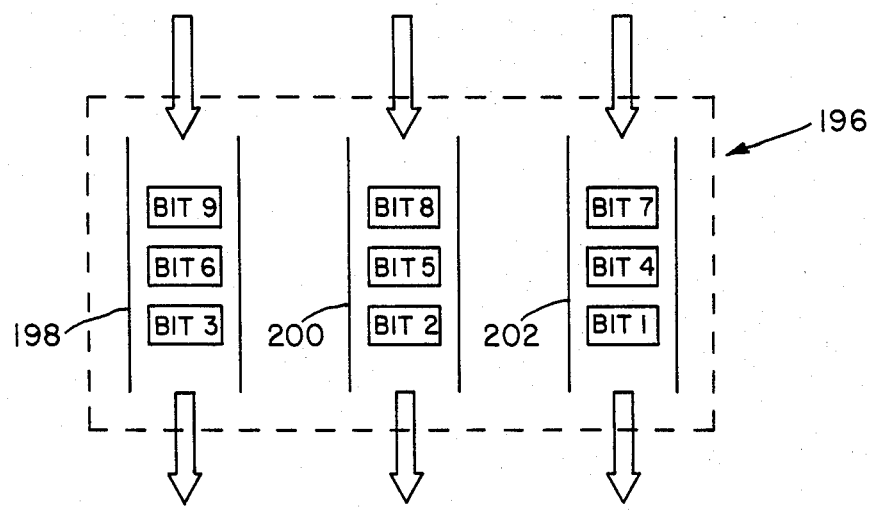
FIG. 3 is a schematic illustrating how data is divided among a memory device of the embodiment in FIG. 1.

Referring now to FIG. 3, an exemplary description will be made of how digital data is stored in one of the memory modules 24–34. FIG. 3 illustrates a memory module 196 containing only three cells 198, 200, 202 in this example. Memory module 196 is of the recirculating shift register type, and is logically divided into the three cells 198–202 and is illustrated as storing a nine bit program. Storing is by the bit rotation logic method wherein bit one is stored in cell 202, bit 2 stored in 200, bit 3 stored in cell 198, bit 4 stored in cell 202, etc. The data are retrieved from memory module 196 in a parallel fashion and are subsequently transmitted to the fiber optic lines of the data bus, which also operate in parallel. The purpose for the use of bit rotation is to permit memory module 102 in FIG. 1 in data receiving station 14 to operate at a lower data rate during playback.

Referring now to FIG. 4, there is schematically illustrated the interface between fiber optic lines 94–100 and 129 at data receiving station 14. Since the interface between fiber optic lines 94–100 are identical, and 129 similar, only one such interface will be described using fiber optic line 94. Fiber optic line 94 is connected to photodiode module 86 comprising diverging optical element 204, interference filters 206, 208, 210, 212, photodiodes 214, 216, 218, 220, and demodulators 222, 224, 226, 228. Photodiodes 214–220 are connected to respective demodulators 222–228 by respective lines 230, 232, 234, 236. The spectrally multiplexed light beam is transmitted from fiber optic line 94 to diverging optical element 204 which divergingly transmits the light beam to interference filters 206–212, each of which permits only a discrete wavelength to pass therethrough to thereby demultiplex the light beam. As illustrated in FIG. 4, filter 206 permits only wavelength L1 to pass through, filter 208 permits only wavelength L2, filter 210 permits only wavelength L3, and filter 212 permits only wavelength L4 to pass through. The operation of diverging optical element 204 is known and disclosed in U.S. Pat. No 4,062,043 issued Dec. 6, 1977 to Zeidler et al., which is incorporated by reference herein.

The light wavelengths are then transmitted to photodiodes 214-220 and demodulators 222-228 for converting the optical data back to the original digital data The data is then transmitted to memory module 102 as illustrated by digital data flow arrow 104 in FIG. 1. Memory module 102 is arranged identically to memory modules 24-34 with sixteen parallel cells for containing the data.

Thereafter the digital data is retrieved and fed to the DA converter 116 on command from control computer 112 for converting the digital data to analog data, and is then transmitted to RF modulator 120 for subsequent transmission and broadcasting by television 146.

The data in memory modules 24-34 is in compressed digital form, thereby accomplishing a considerable savings in transmission costs. After host computer 20 has signaled electronic switching system 22 to electrically connect the selected one of the memory modules 24-34, host computer 20 then signals communications controller 64 to assume control of the compressed digital data transmitted to laser diode modules 48-54. Communications controller 64 also then assumes control of laser diode module 126. The digital data is compressed in memory modules 24-34 by a technique known as inter-frame differential pulse code modulation. The digital data is received, as described above, at data receiving station 14 and reconstructed by control computer 112. The inter-frame differential pulse code modulation technique just described is known in the art, and additional circuitry may be added to avoid problems caused by rapid motion in the picture. Further, the bit rate requirements may be reduced even further by means of other similar but more complicated procedures.

By utilizing inter-frame differential pulse code modulation, each second of video program playing time yields about 44 megabits. Further, according to the present state of the art, 650 megabits per second can be transmitted on a single wavelength, and since in the present embodiment there are 16 optical data channels in the four fiber optic lines 56, 58, 60, 62, the total transmission rate is 10,400 megabits per second. Therefore, a two hour movie can be transmitted in about 31 seconds (7,200 seconds × 44 megabits per second /10,400 megabits per second).

In operation, the user determines which program he desires to watch, and then inputs the correct address signal in keyboard 18 which transmits the signal to computer control 112, which in turn transmits the signal to automatic modem 134. Automatic modem 134 then transmits via lines 138, 142, modem 143, and line 145 the address signal to host computer 20 which determines which data bus 16 serves the user and enters the address signal in a queue for the particular data bus 16 of the user. Host computer 20 then transmits a receipt signal through line 145, modem 143, lines 142, 138, automatic modem 134, and line 136 to control computer 112, which in turn transmits the signal through line 122 to RF modulator 120 for display on television 146, thereby indicating to the viewer that the host computer 20 has received and entered the selected address signal. Thereafter, host computer 20 transmits other instructions and information to the viewer via digital data flow arrow 193 (FIG. 2) which represents line 124 in FIG. 1. When the user's turn comes up, host computer 20 transmits the address signal to electronic switching system 22 which selects the one identified memory module 24-34 containing the selected video program. Following this, host computer 20 signals communications controller 64 to assume control of laser diode modules 48-54, 126, after which communications controller 64 causes electronic switching system 22 to transmit the selected digital data to laser diode modules 48-54 and thereafter to data receiving station 14 as described above. Communications controller 64 communicates with control computer 112, as described above, when each step of the transmission sequence is begun and terminated.

After transmission, the video program is stored in memory module 102 of data receiving station 14 as earlier described, and communications controller 64 communicates with host computer 20 that data transmission is complete. Host computer 20 then informs the user via digital data flow arrow 193 (FIG. 2) that the program is ready for viewing by displaying a ready signal on television 146. The user begins the video program by depressing a "START" switch on keyboard 18, whereby control computer 112 signals memory module 102 to transfer the digital data to DA converter 116 as illustrated by digital data flow arrow 238 for converting the digital data to analog data upon command from control computer 112. Thereafter control computer 112 commands converter 116 to transmit the analog data to modulator 120 as illustrated by digital data flow arrow 240, and then to television 146 via the analog data flow arrow 148.

Although the above description includes converting the digital data to analog data at the data receiving station 14 for display on television 146, it is contemplated that this step may be eliminated with television sets capable of receiving digital data for display thereof.

Although the above description was made in terms of a fully completed transmission of a program before viewing by the user, the present invention fully contemplates that the user may begin viewing his program before the complete transmission thereof. Central data station 12 may transmit only a portion of the selected program to the user for his viewing, and then begin transmitting a portion of another selected program to a second user. This permits central data station 12 to simultaneously handle several users, rather than waiting for complete transmission of one selected program before proceeding with another user's address signal.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. In a broadcasting system including a central data station, a data receiving station, a fiber optic line means connecting said central data station and said data receiving station, said central data station including means for converting electrical data to optical data and transmitting said optical data through said fiber optic line means to said data receiving station, said data receiving station including means for reconverting said optical data back to said electrical data, and a broadcasting means electrically connected to said data receiving station for receiving and broadcasting said electrical data transmitted from said data receiving station, the improvement comprising:

a plurality of memory devices electrically connected to said central data station, each memory device being identifiable by a respective address signal and having a plurality of data cells, each data cell having electrical data representing a portion of a broadcast program preprogrammed therein such that said memory device contains an entire broadcast program, each said memory device being responsive to its received said address signal transmitted thereto from said central data station to transmit its said electrical data to said converting and transmitting means, and a user-operable generating means near said broadcasting means and operatively connected by telephone line to said central data station for selectively generating any one of said address signals and transmitting said one address signal to said central data station, whereby said central data station transmits said one address signal to one of said memory devices identified by said one address signal, said one memory device transmitting its said electrical data to said converting and transmitting means for converting said electrical data to pulse code modulated optical data and transmitting said optical data through said fiber optic line means to said data receiving station, said converting and transmitting means comprising a plurality of parallel transmission means for simultaneous transmission of said optical signals representing electrical data in each of said data cells, said reconverting means reconverting said optical data back to said electrical data and said data receiving station transmitting said electrical data to a memory device for selective transmission to said broadcasting means for the broadcast of said broadcast program represented by said electrical data to the user.

2. The system of claim 1 wherein said memory devices are programmable digital memory devices, each said programmable digital memory device having its respective said electrical data preprogrammed therein in digital form.

3. The system of claim 2 wherein said data receiving station includes a digital-to-analog converter means for converting electrical data from digital to analog form for transmission to said broadcasting means.

4. The system of claim 2 wherein said broadcasting means includes a digital-to-analog converter means for converting electrical data received from said data processing station from digital to analog form for the broadcasting thereof.

5. The system of claim 2 wherein said memory devices have their respective said digital electric data preprogrammed therein in compressed digital form.

6. The system of claim 1 further including a memory means operatively electrically connected to said data receiving station and said broadcasting means for storing therein for an indefinite period of time received electrical data, said memory means being responsive to a received transmit signal for transmitting said stored electrical data therefrom for subsequent broadcast by said broadcasting means, said generating means being operatively electrically connected to said memory means for generating and transmitting a transmit signal to said memory means.

7. The system of claim 6 further including a plurality of said data receiving stations connected to said fiber optic line means, a like plurality of said broadcasting means electrically connected to respective ones of said data receiving stations for receiving and broadcasting electrical data transmitted from respective said data receiving stations to a plurality of users, a like plurality of said memory means operatively electrically connected to respective ones of said data receiving stations and respective ones of said broadcasting means, and a like plurality of said user-operable generating means at respective ones of said broadcasting means and connected to said central data station, whereby any one or the plurality of users may individually selectively generate any one of said address signals to store selected electrical data in respective ones of said memory means, and thereafter individually selectively generate a transmit signal for the broadcasting of selected electrical data.

8. The system of claim 7 wherein said broadcast programs are video programs and said broadcasting means are televisions for broadcasting respective ones of said video programs.

9. A method for broadcasting on a non-real-time basis any one of a plurality of electrical data representing different broadcast programs, comprising the steps of:

providing a central data station including an electro-optical transducer apparatus for converting electrical data to optical data, a data receiving station including an optico-electrical transducer apparatus for reconverting the optical data back to the electrical data, a fiber optic line comprising a plurality of transmission channels connecting the transducer apparatuses, and a broadcasting device electrically connected to the data receiving station for receiving and broadcasting the electrical data transmitted from the data receiving station, providing a plurality of memory devices electrically connected to the central data station, each memory device having a plurality of data cells and being identifiable by a respective address signal, preprogramming each memory device data cell with electrical data representing a portion of a broadcast program such that each memory device contains an entire broadcast program, each memory device being responsive to its received address signal to thereby transmit its electrical data to the electro-optical transducer apparatus, providing a user-operable generating device at the location of the broadcasting device, the user-operable generating device being electrically connected by a telephone line to the central data station and responsive to input applied by the user for generating any one of the address signals, applying an input to the generating device to generate a selected one of the address signals, transmitting the generated address signal to the central data station for identification of the memory device identifiable by the generated address signal, transmitting the generated address signal to the identified memory device, whereby the memory device simultaneously transmits the electrical data in each of its data cells to the electro-optical transducer apparatus for converting the electrical data to digital pulse code modulated optical data and then transmits the optical data through the plurality of transmission channels of the fiber optic line to the optico-electrical transducer apparatus for reconverting the optical data back to the electrical data, each of said channels carrying a separate portion of said entire broadcast program, and thereafter transmitting the electrical data to the broadcasting device for the broadcasting thereof.

10. The method of claim 9 wherein the electrical data preprogrammed in each respective memory device is in digital form.

11. The method of claim 10 further including the step of providing the data receiving station with a digital-to-analog converter for converting digital electrical data to analog electrical data for broadcasting by the broadcasting device.

12. The method of claim 11 wherein the step of preprogramming each memory device with electrical data in digital form includes preprogramming the electrical data in compressed digital form.

13. The method of claim 9 further including the step of storing the electrical data reconverted by the optico-electrical transducer apparatus in an other memory device operatively electrically connected to the data receiving station and the broadcasting device for broadcasting at a later time.

14. The method of claim 13 wherein the other memory device is responsive to a received transmit signal for transmitting its stored electrical data to the broadcasting device, and wherein the user-operable generating device is operatively electrically connected to the other memory device and responsive to other input applied by the user for generating and transmitting the transmit signal to the other memory device, and further including the step of applying other input to the generating device, whereby the other memory device transmits its stored electrical data to the broadcasting device.

* * * * *